USOO5733837A

United States Patent [19]

Nakatsuji et al.

[11] Patent Number: 5,733,837

[45] Date of Patent: Mar. 31, 1998

[54] CATALYST FOR CATALYTIC REDUCTION OF NITROGEN OXIDES

[75] Inventors: Tadao Nakatsuji; Hiromitsu Shimizu; Ritsu Yasukawa, all of Osaka; Katsumi Miyamoto, Saitama; Hiroshi Tsuchida, Kanagawa, all of Japan

[73] Assignees: Sakai Chemical Industry Co., Ltd., Osaka; Petroleum Energy Center; Cosmo Oil Co., Ltd., both of Tokyo, all of Japan

[21] Appl. No.: 628,855

[22] Filed: Apr. 5, 1996

Related U.S. Application Data

[63] Continuation of Ser. No. 239,416, May 6, 1994, abandoned.

[30] Foreign Application Priority Data

May 10, 1993 [JP] Japan ................................. 5-108118
May 10, 1993 [JP] Japan ................................. 5-108119

[51] Int. Cl.$^6$ .................................................. B01J 23/10
[52] U.S. Cl. .............................. 502/304; 502/65; 423/239
[58] Field of Search ................. 502/304, 65; 423/213.5, 423/239

[56] References Cited

U.S. PATENT DOCUMENTS

| | | | |
|---|---|---|---|
| 4,855,115 | 8/1989 | Imanari et al. | 423/239 |
| 4,996,180 | 2/1991 | Diwell et al. | 502/304 |
| 5,041,407 | 8/1991 | Williamson et al. | 502/303 |
| 5,124,304 | 6/1992 | Blanchard et al. | 502/304 |
| 5,238,890 | 8/1993 | Hayasaka et al. | 423/213.2 |
| 5,474,965 | 12/1995 | Nakatsuji et al. | 502/330 |

FOREIGN PATENT DOCUMENTS

| | | |
|---|---|---|
| 0453412 | 7/1991 | European Pat. Off. . |
| 0459396 | 12/1991 | European Pat. Off. . |
| 0483715 | 5/1992 | European Pat. Off. . |
| 0532024 | 3/1993 | European Pat. Off. . |

OTHER PUBLICATIONS

Database WPI, Derwent Publications, Ltd., London, GB; AN 90–104493 (no dates available).

Primary Examiner—Glenn Caldarola
Assistant Examiner—Bekir L. Yildirim
Attorney, Agent, or Firm—Sughrue, Mion, Zinn, Macpeak & Seas, PLLC

[57] ABSTRACT

A catalyst for catalytic reduction of nitrogen oxides using a hydrocarbon and/or a oxygen-containing organic compound as a reducing agent is disclosed, which comprises a cerium oxide supported on a solid acid carrier.

Also, a catalyst for catalytic reduction of nitrogen oxides using a hydrocarbon and/or an oxygen-containing organic compound as a reducing agent is disclosed, which comprises:

(a) at least one element selected from the elements of Group Ib, Group IIa, Group IIb, Group IIIa, Group IIIb, Group IVa, Group IVb, Group Va, Group VIa, Group VIIa, and Group VIII in the Periodic Table (hereinafter referred to as the elements belonging to group (a)); and (b) a cerium oxide, supported on a solid acid carrier.

8 Claims, No Drawings

CATALYST FOR CATALYTIC REDUCTION OF NITROGEN OXIDES

This is a Continuation of application Ser. No. 08/239,416 filed May 6, 1994, now abandoned.

FIELD OF THE INVENTION

The present invention relates to a catalyst for catalytic reduction of nitrogen oxides using a hydrocarbon and/or an oxygen-containing organic compound as a reducing agent. More particularly, it relates to a catalyst for catalytic reduction of nitrogen oxides which is suitable for reduction and removal of harmful nitrogen oxides contained in emissions from factories, automobiles, etc.

BACKGROUND OF THE INVENTION

Nitrogen oxides present in exhaust or emissions have been removed by, for example, a method in which the nitrogen oxides is further oxidized and then absorbed in an alkali or a method comprising reducing it to nitrogen by using ammonia, hydrogen, carbon monoxide, hydrocarbons, etc. as a reducing agent.

These conventional methods have their own disadvantages. That is, the former method requires a means for handling the alkaline waste liquid to prevent environmental pollution. Of the latter method, the method of using ammonia as a reducing agent involves the problem that ammonia reacts with sulfur oxides in the emissions to form salts, resulting in a reduction in catalyst activity. When in using hydrogen, carbon monoxide, or a hydrocarbon as a reducing agent, the reducing agent preferentially undergoes reaction with oxygen because oxygen is present in a higher concentration than nitrogen oxide in emission. This means that substantial reduction of nitrogen oxides requires a large quantity of the reducing agent.

It has recently been proposed to catalytically decomposing nitrogen oxides in the absence of a reducing agent. However, known catalysts for direct decomposition of nitrogen oxides have not yet been put to practical use due to their low decomposing activity.

On the other hand, H type zeolite, Cu ion-exchanged ZSM-5, etc. have also been proposed as a catalyst for catalytic reduction of nitrogen oxides using a hydrocarbon or an oxygen-containing organic compound as a reducing agent. In particular, H type ZSM-5 ($SiO_2/Al_2O_3$ molar ratio=30 to 40) are regarded optimal. However, even the H type ZSM-5 is not deemed to have sufficient reducing activity. In particular, when the emissions have some water content, the zeolite structure is dealuminated, showing a sudden drop in its performance. It has thus been demanded to develop a catalyst for catalytic reduction of nitrogen oxides which exhibits higher reduction activity and shows a high durability even if the emissions have some water content.

SUMMARY OF THE INVENTION

An object of the present invention is to provide a catalyst for catalytic reduction of nitrogen oxides using a hydrocarbon and/or an oxygen-containing organic compound as a reducing agent, which selectively catalyzes a reaction of nitrogen oxides with the reducing agent even in the presence of oxygen and particularly in the presence of oxygen and water content so that nitrogen oxides in emissions can be reduced efficiently without requiring a large quantity of the reducing agent and a high durability can be provided even in the presence of water content.

The present invention provides a catalyst for catalytic reduction of nitrogen oxides using a hydrocarbon and/or a oxygen-containing organic compound as a reducing agent, which comprises a cerium oxide supported on a solid acid carrier.

The present invention further provides a catalyst for catalytic reduction of nitrogen oxides using a hydrocarbon and/or an oxygen-containing organic compound as a reducing agent, which comprises:

(a) at least one element selected from the elements of Group Ib, Group IIa, Group IIb, Group IIIa, Group IIIb, Group IVa, Group IVb, Group Va, Group VIa, Group VIIa, and Group VIII in the Periodic Table (hereinafter referred to as the elements belonging to group (a)); and (b) a cerium oxide, supported on a solid acid carrier.

DETAILED DESCRIPTION OF THE INVENTION

The terminology "solid acid carrier" as used in the present invention means a carrier which is solid and acidic in a temperature at which the catalyst is used. Solid acidity can be confirmed by a temperature rise release method using ammonia or an in situ FTIR (Fourier transform infrared spectrophotometry) method using ammonia or pyridine. The solid acid carrier which can be used in the present invention includes zeolite type solid acid carriers and oxide type solid acid carriers.

The zeolite type solid acid carriers can be obtained by treating heat-resistant zeolite, such as Na-mordenite, Na-ZSM-5, Na-USY (USY: ultrastable Y type zeolite), or metallosilicates (zeolite whose aluminum is partly or wholly replaced with another metallic element, especially iron, gallium, zinc, lanthanum, copper, molybdenum, chromium, germanium, titanium, boron, etc.), with an aqueous solution of an ammonium salt (e.g., ammonium sulfate) or an acid (e.g., sulfuric acid) to exchange a part of or the whole of the alkali metal of the zeolite for an ammonium ion or a hydrogen ion. In the case where the alkali metal is exchanged for an ammonium ion, the product finally requires calcining.

Examples of the zeolite type solid acid carrier include an acid type mordenite, which is obtained by an acid treatment of mordenite type zeolite of the following formula:

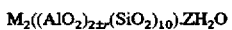

(wherein M represents an alkali metal ion; r is a number subject to variation depending on the conditions of zeolite synthesis, with the $SiO_2/Al_2O_3$ molar ratio ranging from 13 to 40 and the $SiO_2/H_2O$ molar ratio ranging from 25 to 200).

Other examples of the zeolite type solid acid carrier include a zeolite, which is obtained by exchanging a part of or the whole of ion M of zeolite of the following formula for a lanthanum ion ($La^{3+}$), a gallium ion ($Ga^{3+}$), a cerium ion ($Ce^{4+}$), a titanium ion ($Ti^{4+}$), a zirconium ion ($Zr^{4+}$), a tin ion ($Sn^{4+}$), etc.:

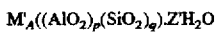

(wherein M' represents an alkali metal ion, an alkaline earth metal, or a hydrogen ion; nA=P (wherein n is a valence number of ion M'); and q/p is 5 or more).

The oxide type solid acid carriers include single metal oxides such as $Al_2O_3$, $TiO_2$, $TiO_2/SO_4^{2-}$, $ZrO_2$, and $ZrO_2/SO_4^{2-}$, and complex oxides such as $SiO_2/Al_2O_3$, $TiO_2/Al_2O_3$, and $TiO_2/ZrO_2$. From the standpoint of heat resistance, preferred of them are $Al_2O_3$, $ZrO_2$, and $SiO_2/Al_2O_3$.

Usable solid acid carriers further include a crystalline aluminum phosphate (hereinafter abbreviated as ALPO) having a zeolite-like porous structure or a lamellar structure and its analogues (hereinafter inclusively referred to as ALPO type phosphates), such as a crystalline silicoaluminum phosphate (hereinafter abbreviated as SAPO) and a crystalline metalloaluminum phosphate (hereinafter abbreviated as MAPO) obtained by displacing part of phosphorus or phosphorus-aluminum of ALPO with a metal, e.g., titanium, iron, magnesium, zinc, manganese, cobalt.

The ALPO type phosphates can be prepared by a hydrothermal process using a raw material comprising the above-mentioned phosphorus source, a metal source, and an appropriate component selected from silica, silica sol, sodium silicate, etc., having mixed therewith a so-called template, e.g., an amine and a quaternary ammonium compound. The conditions for the ALPO type phosphate synthesis are similar to zeolite synthesis. A main difference therebetween consists in that the former is synthesized in a pH acidic condition in higher temperatures (usually 150° C. or higher) than those employed for the latter.

The composition of the ALPO type phosphates is generally represented by $Al_2O_3.(0.8-1.2).P_2O_5.nH_2O$. In SAPO or MAPO, the amount of phosphorus and/or aluminum to be displaced with silica or a metal is about 1/10 the total amount aluminum and phosphorus at the highest. SAPO or MAPO whose silica or metal content is out of this range, i.e., those containing an amorphous may also be employable in the present invention.

Where an ALPO type phosphate obtained by a hydrothermal process is used as a carrier, the synthetic product is usually washed with water, dried, and calcined in air to remove the remaining template.

The cerium oxide used in the present invention can be obtained by calcining cerium hydroxide ($Ce(OH)_3$), cerium nitrate ($Ce(NO_3)_3$), cerium acetate ($Ce(CH_3COO)_3$), etc., in air or under an oxygen atmosphere.

In the following, the elements belonging to group (a) are exemplified. Examples of the Group Ib elements include, e.g., Cu, Ag, Au. Examples of the Group IIa elements include, e.g., Mg, Ca, Sr. Examples of the Group IIb elements include, e.g., Zn. Examples of the Group IIIa elements include, e.g., Y, La, Nd, Cd. Examples of the Group IIIb elements include, e.g., Al, Ga. Examples of the Group IVa elements include, e.g., Ti, Zr. Examples of the Group IVb elements include, e.g., Ge, Sn. Examples of the Group Va elements include, e.g., V, Nb. Examples of the Group VIa elements include, e.g., Cr, Mo. Examples of the Group VIIa elements include, e.g., manganese. Examples of the Group VIII elements include, e.g., Fe, Co, Ni, Ru, Rh, Pd, Ir, Pt.

In the catalyst of the present invention, these elements can be incorporated as a metal, its ion or its oxide.

The catalyst according to the present invention can be prepared by the following process (1), (2) or (3).

Process (1):

A water-soluble salt (e.g., nitrate) of cerium or an alcohol solution of an alkoxide of cerium is poured into a slurry dispersed therein a solid acid carrier, and the slurry is neutralized or hydrolyzed to form a precipitate. Otherwise, a precursor of cerium oxide such as a hydroxide, compound of cerium is supported on the solid acid carrier according to a spray dry method or a freeze-drying method. The resulting solid is worked up by repeatedly subjecting to filtration, washing with water, and repulping, and then dried and calcined.

Next, in cases of applying the elements belonging to group (a), a metal, its ion or its oxide of the elements is supported on the solid acid carrier according to a well known method such as an impregnation method and an ion exchange method.

Process (2):

A solid acid carrier and a separately prepared cerium oxide are thoroughly wet ground by means of a planetary mill, etc.

In cases of applying the elements belonging to group (a), a metal, its ion or its oxide of the elements is previously supported on a cerium oxide, then the resulting product is thoroughly wet ground with a solid acid carrier by means of a planetary mill, etc.

Process (3):

A precursor of a solid acid carrier, such as a water-soluble salt or a hydroxide, and a water-soluble salt (e.g., nitrate) of cerium or an alcohol solution of an alkoxide of cerium are uniformly mixed, and the resulting homogeneous solution is neutralized or hydrolyzed to form a precipitate. The precipitate is worked up by repeatedly subjecting to filtration, washing with water, and repulping, and then dried and calcined.

Next, in cases of applying the elements belonging to group (a), a metal, its ion or its oxide of the elements is supported on the solid acid carrier according to a well known method such as an impregnation method, an ion exchange method, and a deposition method.

In some cases of applying the elements belonging to group (a), the catalyst according to the present invention is preferably obtained by supporting a cerium oxide on an solid acid carrier by an impregnation method, a deposition method, etc., then highly dispersing and supporting thereon an ion of the elements by an ion exchange method, optionally followed by calcination under an acidic atmosphere. The resulting catalyst may be reduced by using hydrogen, etc.

In the catalyst according to the present invention, the suitable cerium oxide supporting ratio is 5 to 80% by weight based on the total amount of the cerium oxide and the solid acid carrier. Hereinafter, the cerium oxide supporting ratio means the weight ratio (%) of (the amount of the cerium oxide) to (the total amount of the cerium oxide and the solid acid carrier). If the cerium oxide supporting ratio exceeds 80% by weight, no further effect is expected. Besides, consumption of the hydrocarbon or oxygen-containing organic compound by oxygen would be increased in a reaction system containing oxygen. On the other hand, if the cerium oxide supporting ratio is less than 5% by weight, the reducing activity of the catalyst cannot be increased as expected. In particular, it is preferred that the cerium oxide supporting ratio be 20 to 50% by weight. If the cerium oxide supporting ratio is within the preferred range, it provides excellent properties of which the SV dependency of the catalytic reduction reaction of nitrogen oxides is extremely small.

In the catalyst according to the present invention, the elements belonging to group (a) are supported in the form of a metal, its ion or its oxide. The supporting ratio thereof is 0.01 to 50%, preferably 0.02 to 20% by weight in terms of metal. Hereinafter, the supporting ratio of the elements belonging to group (a) means the weight ratio of (the amount of the elements belonging to group (a)) in terms of metal to (the total amount of the solid acid carrier, the metal, its ion or its oxide of the elements belonging to group (a), and the cerium oxide).

If the cerium oxide and/or the elements belonging to group (a) is/are supported in the above mentioned supporting ratio(s), any of the above components function as sites of activation by adsorption to hydrocarbon or as sites of activation to nitrogen oxides so that the catalytic reaction proceeds selectively. Thus, it is considered that the catalyst according to the present invention exhibits a high activity and selectivity over a wide range in a catalytic reduction reaction of nitrogen oxides using a hydrocarbon as a reducing agent.

The catalyst according to the present invention may be shaped into various shapes such as honeycomb and sphere by any of well known shaping methods. If desired, appropriate additives, such as shaping assistants, reinforcements, inorganic fibers, and organic binders, may be used on shaping. The catalyst may be coated on a previously molded inactive base by, for example, a wash coat method. For example, the catalyst can be coated on a honeycomb structural product made of clay such as cordierite as the base. Any of known catalyst preparation techniques may be applied.

The hydrocarbons which can be used as a reducing agent in the present invention include gases such as hydrocarbon gas (e.g., methane, ethane, propane, propylene, butylene); and liquids such as unitary hydrocarbon (e.g., pentane, hexane, octane, heptane, benzene, toluene, xylene) and mineral oil hydrocarbon (e.g., gasoline, kerosine, gas oil, heavy oil). In the present invention, among these reducing agents, lower alkynes such as acetylene, methylacetylene and 1-butyne, lower alkenes such as ethylene, propylene, isobutylene, 1-butene and 2-butene, lower dienes such as butadiene and isoprene, and lower alkanes such as propane and butane are preferably used. These hydrocarbons may be used singly or in combination as necessary.

The oxygen-containing organic compounds which can be used as a reducing agent in the present invention include, for example, alcohols such as methanol, ethanol, propanol, and octanol, ethers such as dimethyl ether, diethyl ether, and dipropyl ether, carboxylates such as methyl acetate, ethyl acetate and fats and oils, and ketones such as acetone and methyl ethyl ketone. These are preferred but non-limiting examples. These oxygen-containing organic compounds may be used singly or in combination as necessary. The hydrocarbons and the oxygen-containing organic compounds may be used in combination.

The amount of the hydrocarbon or the oxygen-containing organic compound to be used as a reducing agent, though varying depending on its kind, is normally from 0.1 to 2 mols per mol of nitrogen oxides. If the reducing agent molar ratio falls below 0.1, sufficient reducing activity cannot be obtained with respect to nitrogen oxides. On the contrary, if the reducing agent molar ratio exceeds 2, the amount of the hydrocarbon or the oxygen-containing organic compound which is withdrawn as being unreacted increases, requiring some post treatment for recovery of the unreacted hydrocarbon or oxygen-containing organic compound after the catalytic reduction of nitrogen oxides.

In addition, uncombusted matters or incomplete combustion products of fuels, etc. present in emissions, i.e., hydrocarbons and particulate matters, are also effective as a reducing agent and, accordingly, included in the term "hydrocarbons" as used herein. In other words, the catalyst of the present invention is deemed useful for removal or reduction of the hydrocarbons or particulate matters of emissions.

The temperature at which the above-mentioned reducing agent selectively reduces nitrogen oxides ascends in the order of oxygen-containing organic compounds, alkynes, alkenes, aromatic hydrocarbons, and alkanes. The greater the carbon atom number of hydrocarbons, the lower the effective temperature.

A suitable temperature for the catalyst of the present invention to show catalysis in reduction of nitrogen oxides usually ranges from 100° to 800° C., and preferably 200° to 500° C., though varying depending on the kind of the reducing agent or catalyst species used. Within the above recited temperature range, exhaust gas to be treated is preferably made to flow at a space velocity (SV) of from 500 to 100,000 $hr^{-1}$.

The present invention will be further described in the following examples, but the present invention should not be construed as being limited thereto.

EXAMPLE A-1

8.0 g of cerium nitrate ($Ce(NO_3)_3.6H_2O$) was dissolved in 100 ml of ion-exchanged water. Into the solution was put 60 g of H type mordenite powder ("HM-23" produced by Nippon kagaku Co., Ltd.) which had been previously dried at 120° C. for 24 hours. Thereto, $\frac{1}{10}$ N aqueous ammonia was added dropwise under stirring with adjusting a pH using a pH controller which had been set a pH of 8. After the dropwise addition, the resulting solution was ripened for 1 hour to deposit and support cerium hydroxide on the H-type mordenite.

The slurry thus obtained was filtrated to collect a cerium hydroxide-supported H type mordenite powder. After thoroughly washed with ion-exchanged water, the resulting product was calcined at 500° C. for 3 hours to obtain an H type mordenite powder supporting 5 wt % of cerium oxide (designated as Catalyst A-1).

EXAMPLE A-2

Catalyst A-2 having 20 wt % of cerium oxide supported on H type mordenite powder was prepared in the same manner as in Example A-1 except that 37.8 g of cerium nitrate was used.

EXAMPLE A-3

Catalyst A-3 having 30 wt % of cerium oxide supported on H type mordenite powder was prepared in the same manner as in Example A-1 except that 64.9 g of cerium nitrate was used.

EXAMPLE A-4

Catalyst A-4 having 40 wt % of cerium oxide supported on H type mordenite powder was prepared in the same manner as in Example A-1 except that 100.9 g of cerium nitrate was used.

EXAMPLE A-5

Catalyst A-5 having 50 wt % of cerium oxide supported on H type mordenite powder was prepared in the same manner as in Example A-1 except that 151.4 g of cerium nitrate was used.

EXAMPLE A-6

Catalyst A-6 having 70 wt % of cerium oxide supported on H type mordenite powder was prepared in the same manner as in Example A-1 except that 353.2 g of cerium nitrate was used.

EXAMPLE A-7

Catalyst A-7 having 30 wt % of cerium oxide supported on H-ZSM-5 powder was prepared in the same manner as in Example A-3 except that H-ZSM-5 powder ($SiO_2/Al_2O_3$=40 in molar ratio) was used in place of the H type mordenite.

EXAMPLE A-8

Catalyst A-8 having 30 wt % of cerium oxide supported on γ-alumina powder was prepared in the same manner as in Example A-3 except that γ-alumina powder ("A-11" produced by Sumitomo Chemical Co., Ltd.) was used in place of the H type mordenite.

EXAMPLE A-9

(Preparation of H—Fe Silicate)

Into a mixture of 162 g of 50% silica sol and 500 g of water were added dropwise an aqueous solution of 9.28 g of ferric nitrate (Si/Fe=60 in atomic ratio) in 200 g of water and an aqueous solution of 22.26 g of potassium hydroxide in 200 g of water with stirring for about 30 minutes, respectively.

Thereinto, 35.19 g of tetrapropylammonium bromide was dissolved and mixed. The resulting mixture was charged in an autoclave, then it was stirred and mixed at 160° C. for 16 hours. The reaction product was collected by filtration, washed with water, dried, and further calcined in air at 500° C. for 3 hours to provide Fe silicate of ZSM-5 type (K exchanger).

30 g of Fe silicate was added to 500 ml of 0.5 mol/l of aqueous ammonium nitrate solution. After stirring for 3 hours on an oil bath of 60° C., the reaction product was separated by filtration. After repeating this procedure three times, the collected product by filtration was washed with water and dried, further calcined in air at 500° C. for 3 hours to provide a proton type Fe silicate (H—Fe silicate) powder.

(Preparation of Catalyst)

Catalyst A-9 having 30 wt % of cerium oxide supported on H-Fe silicate powder was prepared in the same manner as in Example A-3, except that the H-Fe silicate powder prepared above was used in place of the H type mordenite.

EXAMPLE A-10

(Preparation of MAPO-5)

To a solution of 4.9 g of manganese (II) acetate and 4.1 g of cupric acetate in 129 g of water was added 56.3 g of finely ground aluminum isopropoxide in small portions, and the mixture was stirred to form a uniform mixture.

A mixture of 55.4 g of 85% phosphoric acid, 56.3 g of diethylethanolamine, and 55.5 g of water was added to the mixture in small portions with stirring, followed by stirring to form a uniform mixture. The mixture was charged in an autoclave and allowed to react at 200° C. for 25 hours. The reaction product was collected by filtration, washed with water, dried, and calcined in air at 500° C. for 3 hours to provide MAPO-5 powder. The MAPO-5 powder thus obtained was found to contain 19.0 wt % of Al, 19.0 wt % of P, 2.8 wt % of Mn, and 4.4 wt % of Cu.

(Preparation of Catalyst)

Catalyst A-10 having 30 wt % of cerium oxide supported on MAPO-5 powder was prepared in the same manner as in Example A-3, except that the MAPO-5 powder prepared above was used in place of the H type mordenite.

EXAMPLE A-11

(Preparation of Zr-Mordenite)

100 g of Na-mordenite ("NM-100P" produced by Nippon Kagaku Co., Ltd.) was dipped in an aqueous zyrconyl nitrate solution ($ZrO_2$ content: 100 g/l), and the system was kept at 70° C. for 1 hour with stirring to exchange the Na ion for a Zr ion. The solid was collected by filtration, washed with water, and calcined at 650° C. for 4 hours. The thus obtained zeolite (Zr-mordenite) had a Zr content of 3.3 wt % and specific surface area of 391 $m^2/g$.

(Preparation of Catalyst)

Catalyst A-11 having 30 wt % of cerium oxide supported on Zr-mordenite powder was prepared in the same manner as in Example A-3, except that the Zr-mordenite powder prepared above was used in place of the H type mordenite.

EXAMPLE A-12

(Preparation of Silica-Zirconia)

100.0 g of O type silica sol (produced by Nissan Chemicals Industries, Ltd.; $SiO_2$ content: 20 wt %) and 97.20 g of zirconium chloride ($ZrCl_4$) were mixed by thoroughly stirring, and water was added thereto to make 500 ml. To the solution was added dropwise a 121 g/l aqueous sodium hydroxide solution to adjust to a pH of 10. After the precipitation reaction was completed, the mixture was stirred for 18 hours. The reaction product was repeated filtrated, washed with water, and repulped to obtain a filter cake. The filter cake was dried at 120° C. for 18 hours and then calcined at 500° C. for 3 hours. The resulting silica-zirconia had a specific surface area of 297 $m^2/g$.

(Preparation of Catalyst)

Catalyst A-12 having 30 wt % of cerium oxide supported on the silica-zirconia powder was prepared in the same manner as in Example A-3, except that the silica-zirconia powder prepared above was used in place of the H type mordenite.

EXAMPLE A-13

(Preparation of La-Mordenite)

100 g of H type mordenite ("HM-13" produced by Nippon Kagaku Co., Ltd.) was added to 250 ml of ion-exchanged water, and (1+5) hydrochloric acid was added thereto to make a pH of 6.0.

To the H type mordenite slurry was added an aqueous lanthanum ion ($La^{3+}$) solution in which 3.12 g of lanthanum nitrate ($La(NO_3)_3.6H_2O$) was dissolved in 50 ml of ion-exchanged water with thoroughly stirring to conduct a lanthanum ion exchange, during which 2 wt % aqueous ammonia was added depending on lowering of pH to maintain a pH of 6.0. After a predetermined amount of aqueous lanthanum ion solution was added to the H type mordenite slurry, stirring was conducted for 2 hours.

Thereafter, the solid content was collected by filtration from the resulting slurry to provide a lanthanum ion exchanged mordenite powder on which 1 wt % of lanthanum ion was supported.

(Preparation of Catalyst)

Catalyst A-3 having 30 wt % of cerium oxide supported on the lanthanum ion exchanged mordenite powder was prepared in the same manner as in Example 1, except that the lanthanum ion exchanged mordenite powder prepared above was used in place of the H type mordenite.

EXAMPLE A-14

(Preparation of SAPO-34)

To 129.6 of water was added 90.7 g of finely ground aluminum isopropoxide in small portions with stirring, and the mixture was stirred to form a uniform mixture. To the mixture was added dropwise 51.3 g of a 85% aqueous phosphoric acid solution, followed by stirring to form a uniform mixture. To the mixture was further added 16.0 g of 50% silica sol, followed by thoroughly stirring to form a uniform mixture.

Then, 81.6 g of tetraethylammonium hydroxide was added thereto, followed by thoroughly stirring. The mixture was charged in an autoclave and allowed to react at 200° C. for 24 hours. The reaction product was collected by filtration, washed with water, dried, and calcined in air at 500° C. for 3 hours to obtain SAPO-34. SAPO-34 was found to contain 9.5 wt % of Si, 18.0 wt % of Al, and 19.0 wt % of P.

(Preparation of Catalyst)

Catalyst A-14 having 30 wt % of cerium oxide supported on SAPO-34 powder was prepared in the same manner as in Example A-3, except that the SAPO-34 prepared above was used in place of the H type mordenite.

EXAMPLE A-15

Catalyst A-15 having 20 wt % of cerium oxide supported on H type mordenite powder was prepared in the same manner as in Example A-1, except that 3.0 of cerium nitrate was used.

EXAMPLE A-16

Catalyst A-16 having 80 wt % of cerium oxide supported on H type mordenite powder was prepared in the same manner as in Example A-1, except that 605.5 g of cerium nitrate was dissolved in 300 ml of ion-exchanged water.

EXAMPLE A-17

(Preparation of Ce-Mordenite)

100 g of H type mordenite ("HM-13" produced by Nippon Kagaku Co., Ltd.) was added to 250 ml of ion-exchanged water, and (1+5) hydrochloric acid was added thereto to make a pH of 6.0.

To the H type mordenite slurry was added an aqueous cerium ion ($Ce^{3+}$) solution in which 3.1 g of cerium nitrate ($Ce(NO_3)_3 \cdot 6H_2O$) was dissolved in 50 ml of ion-exchanged water with thoroughly stirring to conduct a cerium ion exchange, during which 2 wt % aqueous ammonia was added depending on lowering of pH to maintain a pH of 6.0. After a predetermined amount of aqueous cerium ion solution was added to the H type mordenite slurry, stirring was conducted for 2 hours.

Thereafter, the solid content was collected by filtration from the resulting slurry to provide a cerium ion exchanged mordenite powder on which 1 wt % of cerium ion was supported.

(Preparation of Catalyst)

Catalyst A-17 having 30 wt % of cerium oxide supported on the cerium ion exchanged mordenite powder was prepared in the same manner as in Example A-3, except that the cerium ion exchanged mordenite powder prepared above was used in place of the H type mordenite.

Comparative Example 1

151.4 g of cerium nitrate ($Ce(NO_3)_3 \cdot 6H_2O$) was dissolved in 200 ml of ion-exchanged water. Thereto, 1/10 N aqueous ammonia was added dropwise under stirring with adjusting a pH using a pH controller which had been set a pH of 8. After the dropwise addition, the resulting solution was ripened for 1 hour to form cerium hydroxide.

The slurry thus obtained was filtrated to collect a cerium hydroxide. After thoroughly washed with ion-exchanged water, the resulting product was calcined at 500° C. for 3 hours to obtain a cerium oxide powder having a specific surface of 47 $m^2/g$ (designated as Catalyst X-1).

Comparative Example 2

H type mordenite ("HM-23" produced by Nippon Kagaku Co., Ltd.) was used as Catalyst X-2.

Manufacture of Catalyst Structure

To 60 g of each catalyst powders of Examples A-1 to A-17 and Comparative Examples 1 and 2 was added 60 ml of silica sol. The mixture was ground and mixed in a planetary mill for 30 minutes, and the viscosity was adjusted with ion-exchanged water to prepare a wash coating slurry.

The resulting slurry was coated on a honeycomb having a pitch of 1.25 mm (produced by Cordierite Co.) in such a ratio that 0.9 to 1.0 g of the slurry per 1 ml of honeycomb and dried to prepare a honeycomb catalyst structure.

Evaluation Test

Each honeycomb catalysts using Catalysts A-1 to A-17 according to the present invention and Catalysts X-1 and X-2 for comparison was used to subject a nitrogen oxides-containing gas to catalytic reduction of nitrogen oxides under the following conditions. The percent nitrogen oxide removal was determined by the chemical luminescence method.

(Test Conditions)
(1) Gas Composition:
NO: 500 ppm
$O_2$: 10% by volume
Reducing agent: 500 ppm
Water: 6% by volume
Nitrogen: balance
(2) Space Velocity: 10,000, 20,000, or 30,000 $hr^{-1}$
(3) Reaction Temp.: 250° C., 300° C., 350° C., 400° C., or 450° C.

The results are set forth in Table A.

TABLE A

| Catalyst | Reducing Agent | SV ($\times 10^4$) ($Hr^{-1}$) | Nitrogen Oxide Removal (%) 250° C. | 300° C. | 350° C. | 400° C. | 450° C. |
|---|---|---|---|---|---|---|---|
| A-1 | Propylene | 1 | 13.4 | 30.7 | 44.4 | 41.5 | 28.3 |
|  | Propylene | 2 | 4.2 | 15.8 | 23.9 | 21.7 | 13.0 |
| A-2 | Propylene | 1 | 15.6 | 34.4 | 50.3 | 42.9 | 31.0 |
|  | Propylene | 2 | 10.8 | 26.3 | 34.6 | 31.4 | 22.1 |
| A-3 | Propylene | 1 | 17.7 | 36.1 | 50.1 | 44.6 | 36.5 |
|  | Propylene | 2 | 13.8 | 33.1 | 46.9 | 41.2 | 35.9 |
|  | Methanol | 1 | 59.7 | 31.6 | 19.1 | 2.6 | 0.0 |
|  | DME | 1 | 21.8 | 42.0 | 35.9 | 28.2 | 19.1 |
| A-4 | Propylene | 1 | 21.4 | 49.1 | 64.5 | 52.1 | 30.2 |
|  | Propylene | 2 | 20.9 | 48.4 | 63.0 | 51.1 | 29.7 |
|  | Ethylene | 1 | 23.4 | 40.1 | 62.0 | 50.2 | 33.5 |
|  | Propane | 1 | 13.1 | 37.8 | 51.7 | 63.8 | 43.7 |
| A-5 | Propylene | 1 | 14.2 | 45.3 | 61.6 | 56.3 | 33.6 |
|  | Propylene | 2 | 14.3 | 44.4 | 61.0 | 56.3 | 35.5 |
| A-6 | Propylene | 1 | 10.7 | 39.6 | 52.4 | 50.5 | 31.9 |
|  | Propylene | 2 | 10.2 | 36.6 | 52.2 | 51.1 | 31.4 |
| A-7 | Propylene | 1 | 16.5 | 38.4 | 52.0 | 45.9 | 38.7 |
| A-8 | Propylene | 1 | 4.0 | 10.5 | 22.3 | 39.5 | 40.2 |
|  | IPA | 1 | 22.7 | 45.3 | 29.9 | 17.5 | 3.0 |
| A-9 | Propylene | 1 | 11.9 | 35.0 | 59.2 | 47.5 | 35.5 |
|  | Ethanol | 1 | 42.5 | 51.7 | 26.4 | 18.3 | 6.3 |
|  | Acetone | 1 | 33.6 | 49.3 | 37.6 | 21.2 | 15.7 |
| A-10 | Propylene | 1 | 21.5 | 41.7 | 55.2 | 31.8 | 29.6 |
| A-11 | Propylene | 1 | 20.1 | 45.4 | 51.9 | 37.0 | 28.7 |
| A-12 | Propylene | 1 | 0.0 | 9.1 | 25.7 | 39.5 | 40.6 |

TABLE A-continued

| Catalyst | Reducing Agent | SV (× 10⁴) (Hr⁻¹) | Nitrogen Oxide Removal (%) | | | | |
|---|---|---|---|---|---|---|---|
| | | | 250° C. | 300° C. | 350° C. | 400° C. | 450° C. |
| A-13 | Propylene | 1 | 25.6 | 50.5 | 72.6 | 61.0 | 44.2 |
| | Propylene | 2 | 23.8 | 49.2 | 72.9 | 60.2 | 45.7 |
| | Propylene | 3 | 19.2 | 40.0 | 67.4 | 55.4 | 40.2 |
| | Propane | 1 | 16.6 | 41.7 | 58.3 | 64.7 | 57.5 |
| A-14 | Propylene | 1 | 13.4 | 30.1 | 53.1 | 42.0 | 37.8 |
| A-15 | Propylene | 1 | 8.6 | 28.2 | 35.7 | 39.5 | 12.2 |
| A-16 | Propylene | 1 | 12.3 | 21.9 | 38.2 | 34.3 | 20.3 |
| A-17 | Propylene | 1 | 28.7 | 54.2 | 75.3 | 68.1 | 47.5 |
| | Propylene | 2 | 23.6 | 50.3 | 74.1 | 67.6 | 47.5 |
| | Propylene | 3 | 19.6 | 43.3 | 69.8 | 65.3 | 44.7 |
| X-1 | Propylene | 1 | 0.0 | 0.0 | 0.0 | 0.0 | 0.0 |
| X-2 | Propylene | 1 | 5.9 | 6.4 | 0.2 | 0.0 | 0.0 |

Note:
DME = Dimehtylether, IPA = Isopropanol

EXAMPLE B-1

2.28 g of copper nitrate ($Cu(NO_3)_2.3H_2O$) was dissolved in 50 ml of ion-exchanged water to prepare an aqueous copper ion ($Cu^{2+}$) solution. To the solution was added 60 g of Catalyst A-1 (H-type mordenite powder on which 5 wt % of cerium oxide was supported) prepared in Example A-1. While heating, the resulting solution was mixed to evaporate the water content. The dried product thus obtained was heated and dried at 120° C. for 18 hours, and further calcined at 500° C. for 3 hours. Thus, Catalyst B-1 having 5 wt % of cerium oxide and 1 wt % (as copper) of copper oxide supported on H type mordenite was prepared.

EXAMPLE B-2

Catalyst B-2 having 20 wt % of cerium oxide and 1 wt % (as copper) of copper oxide supported on H type mordenite was prepared in the same manner as in Example B-1, except that Catalyst A-2 prepared in Example A-2 was used.

EXAMPLE B-3

Catalyst B-3 having 30 wt % of cerium oxide and 1 wt % (as copper) of copper oxide supported on H type mordenite was prepared in the same manner as in Example B-1, except that Catalyst A-3 prepared in Example A-3 was used.

EXAMPLE B-4

Catalyst B-4 having 40 wt % of cerium oxide and 1 wt % (as copper) of copper oxide supported on H type mordenite was prepared in the same manner as in Example B-1, except that Catalyst A-4 prepared in Example A-4 was used.

EXAMPLE B-5

Catalyst B-5 having 50 wt % of cerium oxide and 1 wt % (as copper) of copper oxide supported on H type mordenite was prepared in the same manner as in Example B-1, except that Catalyst A-5 prepared in Example A-5 was used.

EXAMPLE B-6

Catalyst B-6 having 70 wt of cerium oxide and 1 wt % (as copper) of copper oxide supported on H type mordenite was prepared in the same manner as in Example B-1, except that Catalyst A-6 prepared in Example A-6 was used.

EXAMPLE B-7

9.35 g of lanthanum nitrate ($La(NO_3)_3.6H_2O$) was dissolved in 50 ml of ion-exchanged water to prepare a lanthanum ion ($La^{3+}$) solution. To the solution was added 60 g of Catalyst A-7 (H-ZSM-5 powder on which 30 wt % of cerium oxide was supported) prepared in Example A-7. While heating, the resulting solution was mixed to evaporate the water content. The dried product thus obtained was heated and dried at 120° C. for 18 hours, and further calcined at 500° C. for 3 hours. Thus, Catalyst B-7 having 30 wt % of cerium oxide and 5 wt % (as lanthanum) of lanthanum oxide supported on H-ZSM-5 was prepared.

EXAMPLE B-8

9.12 g of neodymium nitrate ($Nd(NO_3)_3.6H_2O$) was dissolved in 50 ml of ion-exchanged water to prepare an aqueous neodymium ion solution.

To the solution was added 60 g of Catalyst A-7 (H-ZSM-5 powder on which 30 wt % of cerium oxide was supported) prepared in Example A-7. While heating, the resulting solution was mixed to evaporate the water content. The dried product thus obtained was heated and dried at 120° C. for 3 hours, and further calcined at 500° C. for 18 hours. Thus, Catalyst B-8 having 30 wt % of cerium oxide and 1 wt % (as neodymium) of neodymium oxide supported on H-ZSM-5 was prepared.

EXAMPLE B-9

11.0 g of gallium nitrate ($Ga(NO_3)_3$) was dissolved in 50 ml of ethanol which had been previously adjusted to 80° C. to prepare an ethanol solution of gallium ion ($Ga^{3+}$).

To the ethanol solution was added 60 g of Catalyst A-7 (H-ZSM-5 powder on which 30 wt % of cerium oxide was supported) prepared in Example A-7. While heating, the resulting solution was mixed to evaporate the ethanol content. The dried product thus obtained was heated and dried at 120° C. for 18 hours, and further calcined at 500° C. for 3 hours. Thus, Catalyst B-9 having 30 wt % of cerium oxide and 1 wt % (as gallium) of gallium oxide supported on H-ZSM-5 was prepared.

EXAMPLE B-10

8.79 g of zirconyl nitrate ($ZrO(NO_3)_2.2H_2O$) was dissolved in 50 ml of ion-exchanged water.

To the solution was added 60 g of Catalyst A-7 (H-ZSM-5 powder on which 30 wt % of cerium oxide was supported) prepared in Example A-7. While heating, the resulting solution was mixed to evaporate the water content. The dried product thus obtained was heated and dried at 120° C. for 18 hours, and further calcined at 500° C. for 3 hours. Thus, Catalyst B-10 having 30 wt % of cerium oxide and 1 wt % (as zirconium) of zirconium oxide supported on H-ZSM-5 was prepared.

EXAMPLE B-11

Titanium tetrachloride was subjected to neutralization and hydrolysis to obtain ortho-titanic acid. The ortho-titanic acid thus obtained was calcined at 500° C. for 2 hours to obtain a titanium oxide having a specific surface area of 63.5 m²/g. 6 g of titanium oxide thus obtained was added to 50 ml of ion-exchanged water to obtain a slurry.

To the slurry was added 60 g of Catalyst A-7 (H-ZSM-5 powder on which 30 wt % of cerium oxide was supported) prepared in Example A-7. While heating, the resulting solution was mixed to evaporate the water content. The dried product thus obtained was heated and dried at 120° C. for 18 hours, and further calcined at 500° C. for 3 hours. Thus, Catalyst B-11 having 30 wt % of cerium oxide and 5.7 wt % (as titanium) of titanium oxide supported on H-ZSM-5 was prepared.

EXAMPLE B-12

6.5 g of stannic chloride ($SnCl_4$) was added to 50 ml of ion-exchanged water to prepare an aqueous tin ion ($Sn^{4+}$) solution.

To the solution was added 60 g of Catalyst A-7(H-ZSM-5 powder on which 30 wt % of cerium oxide was supported) prepared in Example A-7. While heating, the resulting solution was mixed to evaporate the water content. The dried product thus obtained was heated and dried at 120° C. for 18 hours, and further calcined at 500° C. for 3 hours. Thus, Catalyst B-12 having 30 wt % of cerium oxide and 1 wt % (as tin) of tin oxide supported on H-ZSM-5 was prepared.

EXAMPLE B-13

8.86 g of germanium tetrachloride ($GeCl_4$) was dissolved in 50 ml of ethanol to prepare a germanium ion ($Ge^{4+}$) solution.

To the solution was added 60 g of Catalyst A-7 (H-ZSM-5 powder on which 30 wt % of cerium oxide was supported) prepared in Example A-7. While heating, the resulting solution was mixed to evaporate the ethanol content. The dried product thus obtained was heated and dried at 120° C. for 18 hours, and further calcined at 500° C. for 3 hours. Thus, Catalyst B-13 having 30 wt % of cerium oxide and 1 wt % (as germanium) of germanium oxide supported on H-ZSM-5 was prepared.

EXAMPLE B-14

1.38 g of ammonium metavanadate (($NH_4VO_3$) and 2.06 g of oxalic acid (($COOH)_2$) were dissolved in 50 ml of ion-exchanged water.

To the solution was added 60 g of Catalyst A-3 (H type mordenite powder on which 30 wt % of cerium oxide was supported) prepared in Example A-3. While heating, the resulting solution was mixed to evaporate the water content. The dried product thus obtained was heated and dried at 120° C. for 18 hours, and further calcined at 500° C. for 3 hours. Thus, Catalyst B-14 having 30 wt % of cerium oxide and 1 wt % (as vanadium) of vanadium oxide supported on H type mordenite was prepared.

EXAMPLE B-15

8.72 g of niobium pentachlorie ($NbCl_5$) was dissolved in 50 ml of ethanol to prepare an ethanol solution of niobium ion ($Nb^{5+}$).

To the solution was added 60 g of Catalyst A-7 (H-ZSM-5 powder on which 30 wt % of cerium oxide was supported) prepared in Example A-7. While heating, the resulting solution was mixed to evaporate the ethanol content. The dried product thus obtained was heated and dried at 120° C. for 18 hours, and further calcined at 500° C. for 3 hours. Thus, Catalyst B-15 having 30 wt % of cerium oxide and 5 wt % (as niobium) of niobium oxide supported on H-ZSM-5 was prepared.

EXAMPLE B-16

7.73 g of ammonium molybdate (($NH_4)_6Mo_7O_{24}.4H_2O$) was dissolved in 50 ml of ion-exchanged water.

To the solution was added 60 g of Catalyst A-7 (H-ZSM-5 powder on which 30 wt % of cerium oxide was supported) prepared in Example A-7. While heating, the resulting solution was mixed to evaporate the water content. The dried product thus obtained was heated and dried at 120° C. for 18 hours, and further calcined at 500° C. for 3 hours. Thus, Catalyst B-16 having 30 wt % of cerium oxide and 1 wt % (as molybdenum) of molybdenum oxide supported on H-ZSM-5 was prepared.

EXAMPLE B-17

3.78 g of aqueous ammonium metatungstate solution (produced by Nippon Steel Corp.; 50 wt % as $WO_3$) was added to 50 ml of ion-exchanged water.

To the solution was added 60 g of Catalyst A-7 (H-ZSM-5 powder on which 30 wt % of cerium oxide was supported) prepared in Example A-7. While heating, the resulting solution was mixed to evaporate the water content. The dried product thus obtained was heated and dried at 120° C. for 18 hours, and further calcined at 500° C. for 3 hours. Thus, Catalyst B-17 having 30 wt % of cerium oxide and 2.5 wt % (as tungsten) of tungsten oxide supported on H-ZSM-5 was prepared.

EXAMPLE B-18

4.34 g of ferric nitrate ($Fe(NO_3)_3.9H_2O$) was dissolved in 50 ml of ion-exchanged water to prepare an aqueous iron ion ($Fe^{3+}$) solution.

To the solution was added 60 g of Catalyst A-7 (H-ZSM-5 powder on which 30 wt % of cerium oxide was supported) prepared in Example A-7. While heating, the resulting solution was mixed to evaporate the water content. The dried product thus obtained was heated and dried at 120° C. for 18 hours, and further calcined at 500° C. for 3 hours. Thus, Catalyst B-18 having 30 wt % of cerium oxide and 1 wt % (as iron) of ferric oxide supported on H-ZSM-5 was prepared.

EXAMPLE B-19

2.54 g of cobalt acetate ($Co(CH_3COO)_2.4H_2O$) was dissolved in 50 ml of ion-exchanged water to prepare an aqueous cobalt ion ($Co^{2+}$) solution.

To the solution was added 60 g of Catalyst A-7 (H-ZSM-5 powder on which 30 wt % of cerium oxide was supported) prepared in Example A-7. While heating, the resulting solution was mixed to evaporate the water content. The dried product thus obtained was heated and dried at 120° C. for 18 hours, and further calcined at 500° C. for 3 hours. Thus, Catalyst B-19 having 30 wt % of cerium oxide and 1 wt % (as cobalt) of cobalt oxide supported on H-ZSM-5 was prepared.

EXAMPLE B-20

2.97 of nickel nitrate ($Ni(NO_3)_2.6H_2O$) was dissolved in 50 ml of ion-exchanged water to prepare an aqueous nickel ion ($Ni^{2+}$) solution.

To the solution was added 60 g of Catalyst A-8 (γ-alumina powder on which 30 wt % of cerium oxide was supported) prepared in Example A-8. While heating, the resulting solution was mixed to evaporate the water content. The dried product thus obtained was heated and dried at 120° C. for 18 hours, and further calcined at 500° C. for 3 hours. Thus, Catalyst B-20 having 30 wt % of cerium oxide and 1 wt % (as nickel) of nickel oxide supported on γ-alumina was prepared.

EXAMPLE B-21

22.7 g of γ-alumina powder ("A-11" produced by Sumitomo Chemical Co., Ltd.) was dispersed in 50 ml of ion-exchanged water to prepare a slurry.

To the slurry was added 60 g of Catalyst A-9 (H—Fe silicate powder on which 30 wt % of cerium oxide was supported) prepared in Example A-9. The mixture was pulverized and mixed for 30 minutes with a planetary mill using a zirconia ball as medium. While heating, the resulting slurry was mixed to evaporate the water content. The dried product thus obtained was heated and dried at 120° C. for 18 hours, and further calcined at 500° C. for 3 hours. Thus, Catalyst B-21 having 30 wt % of cerium oxide and 20 wt % (as aluminum) of alumina supported on H—Fe silicate was prepared.

EXAMPLE B-22

17.58 g of zirconyl nitrate ($ZrO(NO_3)_2.2H_2O$) was dissolved in 100 ml of ion-exchanged water.

To the solution was added 60 g of Catalyst A-10 (MAPO-5 powder on which 30 wt % of cerium oxide was supported) prepared in Example A-10. While heating, the resulting solution was mixed to evaporate the water content. The dried product thus obtained was heated and dried at 120° C. for 18 hours, and further calcined at 500° C. for 3 hours. Thus, Catalyst B-22 having 30 wt % of cerium oxide and 1 wt % (as zirconium) of zirconium oxide supported on MAPO-5 was prepared.

EXAMPLE B-23

7.56 g of aqueous ammonium metatungstate solution (produced by Nippon Steel Corp.; 50 wt % as $WO_3$) was added to 50 ml of ion-exchanged water.

To the solution was added 60 g of Catalyst A-11 (Zr-mordenite powder on which 30 wt % of cerium oxide was supported) prepared in Example A-11. While heating, the resulting solution was mixed to evaporate the water content. The dried product thus obtained was heated and dried at 120° C. for 18 hours, and further calcined at 500° C. for 3 hours. Thus, Catalyst B-23 having 30 wt % of cerium oxide and 5 wt % (as tungsten) of tungsten oxide supported on Zr-mordenite was prepared.

EXAMPLE B-24

Catalyst B-24 having 30 wt % of cerium oxide and 0.1 wt % (as copper) of copper oxide supported on the silica-zirconia powder was prepared in the same manner as in Example B-1, except that 60 g of Catalyst A-12 (the silica-zirconia powder on which 30 wt % of cerium oxide was supported) prepared in Example A-12 was used.

EXAMPLE B-25

Catalyst B-25 having 30 wt % of cerium oxide and 1 wt % (as tin) of tin oxide supported on the lanthanum ion exchanged mordenite powder was prepared in the same manner as in Example B-12, except that 60 g of Catalyst A-13 (the lanthanum ion exchanged mordenite powder on which 30 wt % of cerium oxide was supported) prepared in Example A-13 was used.

EXAMPLE B-26

Catalyst B-26 having 30 wt % of cerium oxide and 1 wt % (as iron) of ferric oxide supported on SAPO-34 powder was prepared in the same manner as in Example B-18, except that 60 g of Catalyst A-14 (SAPO-34 powder on which 30 wt % of cerium oxide was supported) prepared in Example A-14 was used.

EXAMPLE B-27

Catalyst B-27 having 2.0 wt % of cerium oxide and 1 wt % (as copper) of copper oxide supported on H type mordenite powder was prepared in the same manner as in Example B-1, except that 3.0 g of cerium nitrate was used.

EXAMPLE B-28

Catalyst B-28 having 80 wt % of cerium oxide and 1 wt % (as copper) of copper oxide supported on H type mordenite powder was prepared in the same manner as in Example B-1, except that 605.5 g of cerium nitrate was dissolved in 300 ml of ion-exchanged water.

EXAMPLE B-29

6 g of titanium oxide prepared in Example B-11 was dissolved in 50 ml of ion-exchanged water to prepare a slurry.

To the slurry was added 60 g of Catalyst A-17 (the cerium ion exchanged powder on which 30 wt % of cerium oxide was supported) prepared in Example A-17. While heating, the resulting slurry was mixed to evaporate the water content. The dried product thus obtained was heated and dried at 120° C. for 18 hours, and further calcined at 500° C. for 3 hours. Thus, Catalyst B-29 having 30 wt % of cerium oxide and 5.7 wt % (as titanium) of titanium oxide supported on the cerium ion exchanged mordenite was prepared.

EXAMPLE B-30

64.9 g of cerium nitrate ($Ce(NO_3)_3.6H_2O$) was dissolved in 100 ml of ion-exchanged water. Into the solution was put 60 g of H type mordenite powder ("HM-23" produced by Nippon kagaku Co., Ltd.) which had been previously dried at 120° C. for 24 hours. Thereto, $1/10$ N aqueous ammonia was added dropwise under stirring with adjusting a pH using a pH controller which had been set a pH of 8. After the dropwise addition, the resulting solution was ripened for 1 hour to deposit and support cerium hydroxide on the H-type mordenite.

The slurry thus obtained was filtrated to collect a cerium hydroxide-supported H type mordenite powder. After thoroughly washed with ion-exchanged water, the resulting product was calcined at 500° C. for 3 hours to obtain an H type mordenite powder supporting 30 wt % of cerium oxide.

The H type mordenite pellet having cerium oxide supported thereon was then put into 250 ml of ion-exchanged water. The pH value of the admixture was 7.1. The pH value of the admixture was then adjusted with a $1/10$ N nitric acid to 5.5.

Separately, in 50 ml of ion-exchanged water was dissolved 0.11 g of tetraammine platinum chloride (II) ([Pt(NH$_3$)$_4$Cl$_2$.H$_2$O) to prepare an aqueous [Pt(NH$_3$)$_4$]$^{2+}$ solution. The aqueous solution was then added to the aqueous solution of the H type mordenite pellet having cerium oxide supported thereon with thorough stirring so that [Pt(NH$_3$)$_4$]$^{2+}$ ions were exchanged with hydrogen ions present in H type mordenite or cerium oxide. During this procedure, as the pH lowered, a 2 wt % aqueous ammonia was added to keep the pH value to 5.5. This procedure continued until the added amount of the aqueous solution of tetraammine platinum chloride (II) reach the predetermined value. The admixture was then stirred at 70° C. for 2 hours.

The ion-exchanged H type mordenite pellet having cerium oxide supported thereon was filtered off, washed with an aqueous solution of nitric acid having a pH value of 5.5, dried at 120° C. for 18 hours, calcined at 500° C. for 4 hours, and then subjected to reduction in a stream of a 4/1 (volumetric ratio) mixture of nitrogen/hydrogen at 400° C. for 1 hour.

Thus, Catalyst B-30 having 30 wt % of cerium oxide and 0.1 wt % of platinum supported on H type mordenite was prepared.

EXAMPLE B-31

H-ZSM-5 powder having 30 wt % of cerium oxide supported thereon was prepared in the same manner as in Example B-30, except that H-ZSM-5 ($SiO_2/Al_2O_3$ molar ratio=40) was used in place of the H type mordenite.

Separately, in 100 ml of ion-exchanged water was dissolved 1.23 g of ruthenium chloride ($RuCl_3$) to prepare an aqueous ruthenium ion ($Rn^{3+}$) solution. To the solution was added the above prepared H-ZSM-5 powder. While heating, the resulting solution was mixed to evaporate the water content. The dried product thus obtained was heated and dried at 120° C. for 18 hours, and further calcined at 500° C. for 3 hours. Thus, Catalyst B-31 having 30 wt % of cerium oxide and 1 wt % of ruthenium supported on H-ZSM-5 was prepared.

EXAMPLE B-32

2.68 g of rhodium chloride ($RhCl_3 \cdot nH_2O$, containing 37.24 wt % of Rh) was dissolved in 59 ml of ion-exchanged water to prepare an aqueous rhodium ion ($Rh^{3+}$) solution.

To the solution was added the H-ZSM-5 powder prepared in Example B-31 having 30 wt % of cerium oxide supported thereon. While heating, the resulting solution was mixed to evaporate the water content. The dried product thus obtained was heated and dried at 120° C. for 3 hours, and further calcined at 500° C. for 18 hours. Thus, Catalyst B-32 having 30 wt % of cerium oxide and 1 wt % of rhodium supported on H-ZSM-5 was prepared.

EXAMPLE B-33

2.66 g of iridium chloride ($IrCl_4$, containing 98.9 wt % of iridium chloride) was dissolved in 100 ml of ion-exchanged water which had been previously heated to 80° C. to prepare an aqueous iridium ion ($Ir^{4+}$) solution.

To the solution was added the H-ZSM-5 powder prepared in Example B-31 having 30 wt % of cerium oxide supported thereon. While heating, the resulting solution was mixed to evaporate the water content. The dried product thus obtained was heated and dried at 120° C. for 18 hours, and further calcined at 500° C. for 3 hours. Thus, Catalyst B-33 having 30 wt % of cerium oxide and 1 wt % of iridium supported on H-ZSM-5 was prepared.

EXAMPLE B-34

4.76 ml of aqueous chloroauric acid solution (0.125 g/l as gold) was added to 100 ml of ion-exchanged water.

To the solution was added the H-ZSM-5 powder prepared in Example B-31 having 30 wt % of cerium oxide supported thereon. While heating, the resulting solution was mixed to evaporate the water content. The dried product thus obtained was heated and dried at 120° C. for 18 hours, and further calcined at 500° C. for 3 hours. Thus, Catalyst B-34 having 30 wt % of cerium oxide and 1 wt % of gold supported on H-ZSM-5 was prepared.

EXAMPLE B-35

0.95 g of silver nitrate ($AgNO_3$) was dissolved in 50 ml of ion-exchanged water to prepare an aqueous silver ion ($Ag^+$) solution.

To the solution was added the H-ZSM-5 powder prepared in Example B-31 having 30 wt % of cerium oxide supported thereon. While heating, the resulting solution was mixed to evaporate the water content. The dried product thus obtained was heated and dried at 120° C. for 18 hours, and further calcined at 500° C. for 3 hours. Thus, Catalyst B-34 having 30 wt % of cerium oxide and 1 wt % of silver supported on H-ZSM-5 was prepared.

Manufacture of Catalyst Structure

To 60 g of each catalyst powders of Examples B-1 to B-35 was added 60 ml of silica sol. The mixture was ground and mixed in a planetary mill for 30 minutes, and the viscosity was adjusted with ion-exchanged water to prepare a wash coating slurry.

The resulting slurry was coated on a honeycomb having a pitch of 1.25 mm (produced by Cordierite Co.) in such a ratio that 0.9 to 1.0 g of the slurry per 1 ml of honeycomb and dried to prepare a honeycomb catalyst structure.

Evaluation Test

Each honeycomb catalysts using Catalysts B-1 to B-35 according to the present invention was used to subject a nitrogen oxides-containing gas to catalytic reduction of nitrogen oxides under the following conditions. The percent nitrogen oxide removal was determined by the chemical luminescence method.

(Test Conditions)
(1) Gas Composition:
  NO: 500 ppm
  $O_2$: 10% by volume
  Reducing agent: 500 ppm
  Water: 6% by volume
  Nitrogen: balance
(2) Space Velocity: 10,000 or 20,000 $hr^{-1}$
(3) Reaction Temp.: 250° C., 300° C., 350° C., 400° C., or 450° C.

The results are set forth in Table B.

TABLE B

| Catalyst | Reducing Agent | SV (× 10⁴) ($Hr^{-1}$) | Nitrogen Oxide Removal (%) 250° C. | 300° C. | 350° C. | 400° C. | 450° C. |
|---|---|---|---|---|---|---|---|
| B-1 | Propylene | 1 | 3.4 | 9.1 | 17.9 | 28.2 | 26.7 |
|  | Propylene | 2 | 2.2 | 8.3 | 15.5 | 27.9 | 25.9 |
| B-2 | Propylene | 1 | 5.1 | 13.7 | 26.9 | 34.3 | 30.8 |
|  | Propylene | 2 | 4.3 | 11.2 | 23.1 | 30.2 | 27.4 |
| B-3 | Propylene | 1 | 9.2 | 28.8 | 38.1 | 41.2 | 37.0 |
|  | Propylene | 2 | 8.8 | 25.2 | 37.2 | 38.6 | 34.8 |
| B-4 | Propylene | 1 | 14.4 | 31.9 | 46.3 | 42.7 | 35.9 |
|  | Propylene | 2 | 12.3 | 29.1 | 45.2 | 40.0 | 33.7 |
|  | Ethylene | 1 | 24.8 | 57.5 | 51.3 | 45.4 | 38.1 |
|  | Propane | 1 | 5.0 | 17.6 | 39.7 | 48.0 | 45.5 |
| B-5 | Propylene | 1 | 17.2 | 34.2 | 41.0 | 33.1 | 26.1 |
|  | Propylene | 2 | 16.9 | 33.6 | 41.1 | 33.3 | 25.2 |
| B-6 | Propylene | 1 | 19.6 | 38.5 | 36.9 | 31.9 | 18.7 |
|  | Propylene | 2 | 18.7 | 37.0 | 36.8 | 30.6 | 19.7 |
| B-7 | Propylene | 1 | 14.6 | 35.6 | 48.3 | 52.8 | 47.3 |
| B-8 | Propylene | 1 | 16.6 | 34.3 | 49.2 | 50.4 | 44.7 |
| B-9 | Propylene | 1 | 19.1 | 38.8 | 53.7 | 57.2 | 46.3 |
| B-10 | Propylene | 1 | 30.4 | 52.6 | 81.6 | 80.5 | 63.0 |
|  | Propylene | 2 | 25.6 | 45.3 | 70.9 | 68.7 | 53.9 |
|  | Methanol | 1 | 69.2 | 44.5 | 23.4 | 5.4 | 0.0 |
|  | DME | 1 | 63.1 | 57.5 | 28.1 | 0.0 | 0.0 |
| B-11 | Propylene | 1 | 31.8 | 54.0 | 87.9 | 87.3 | 67.4 |
|  | Propylene | 2 | 28.1 | 47.9 | 75.1 | 71.8 | 55.5 |
|  | Ethanol | 1 | 82.0 | 62.3 | 45.5 | 14.4 | 0.0 |
|  | Acetone | 2 | 62.1 | 75.5 | 61.4 | 33.6 | 10.4 |
| B-12 | Propylene | 1 | 27.4 | 43.9 | 63.4 | 67.4 | 44.9 |
| B-13 | Propylene | 1 | 13.1 | 32.5 | 51.0 | 55.9 | 30.3 |
| B-14 | Propylene | 1 | 22.8 | 39.4 | 32.1 | 22.9 | 15.6 |

TABLE B-continued

| Catalyst | Reducing Agent | SV (× 10⁴) (Hr⁻¹) | 250° C. | 300° C. | 350° C. | 400° C. | 450° C. |
|---|---|---|---|---|---|---|---|
| B-15 | Propylene | 1 | 27.8 | 54.1 | 76.2 | 78.0 | 59.7 |
| B-16 | Propylene | 1 | 18.2 | 41.6 | 64.6 | 69.3 | 42.4 |
| B-17 | Propylene | 1 | 15.8 | 45.4 | 63.4 | 63.3 | 45.1 |
| B-18 | Propylene | 1 | 15.0 | 39.1 | 58.0 | 52.6 | 36.3 |
| B-19 | Propylene | 1 | 27.8 | 32.7 | 43.1 | 38.8 | 27.3 |
| B-20 | Propylene | 1 | 26.9 | 32.1 | 49.7 | 28.8 | 17.6 |
|  | IPA | 1 | 42.9 | 59.5 | 32.3 | 16.8 | 0.0 |
| B-21 | Propylene | 1 | 21.4 | 46.5 | 63.8 | 61.3 | 49.4 |
| B-22 | Propylene | 1 | 26.0 | 53.0 | 71.7 | 71.3 | 53.2 |
| B-23 | Propylene | 1 | 29.0 | 52.8 | 86.1 | 84.0 | 65.0 |
| B-24 | Propylene | 1 | 13.1 | 36.5 | 35.6 | 29.1 | 19.8 |
| B-25 | Propylene | 1 | 22.7 | 46.1 | 70.0 | 78.3 | 54.0 |
| B-26 | Propylene | 1 | 19.6 | 41.7 | 56.5 | 30.2 | 21.2 |
| B-27 | Propylene | 1 | 2.3 | 7.2 | 15.5 | 23.6 | 19.4 |
| B-28 | Propylene | 1 | 17.7 | 36.5 | 32.6 | 19.2 | 8.0 |
| B-29 | Propylene | 1 | 34.5 | 56.3 | 83.1 | 88.6 | 62.1 |
| B-30 | Propylene | 1 | 23.7 | 42.2 | 53.6 | 41.7 | 30.5 |
|  | Propylene | 2 | 26.8 | 35.2 | 48.5 | 37.6 | 29.7 |
| B-31 | Propylene | 1 | 20.4 | 64.6 | 53.0 | 37.9 | 27.2 |
| B-32 | Propylene | 1 | 18.0 | 63.1 | 51.3 | 37.5 | 26.6 |
| B-33 | Propylene | 1 | 32.3 | 57.1 | 39.5 | 26.8 | 11.6 |
| B-34 | Propylene | 1 | 14.6 | 35.6 | 48.3 | 38.8 | 35.8 |
| B-35 | Propylene | 1 | 34.9 | 59.3 | 47.5 | 29.0 | 12.5 |
| X-1 | Propylene | 1 | 0.0 | 0.0 | 0.0 | 0.0 | 0.0 |
| X-2 | Propylene | 1 | 5.9 | 6.4 | 0.2 | 0.0 | 0.0 |

Note:
DME = Dimehtylether, IPA = Isopropanol

The results set forth in Tables A and B show that the catalysts according to the present invention all provide a high percent nitrogen oxide removal while the comparative catalysts exhibit a low percent nitrogen oxide removal as a whole.

As mentioned above, the catalyst for catalytic reduction of nitrogen oxide according to the present invention can provide an efficient catalytic reduction of nitrogen oxide present in emissions using a hydrocarbon or an oxygen-containing organic compound as a reducing agent over an extended range of temperature even in the presence of oxygen and water content and exhibit a high durability.

While the invention has been described in detail and with reference to specific embodiments thereof, it will be apparent to one skill in the art that various changes and modifications can be made therein without departing from the spirit and scope thereof.

What is claimed is:

1. A composition for a catalytic reduction of nitrogen oxides comprising at least one reducing agent selected from the group consisting of a hydrocarbon and an oxygen-containing organic compound, and a catalyst consisting essentially of cerium oxide supported on a solid acid carrier, wherein the cerium supporting ratio is 30 wt % to 80 wt. % based on the total amount of the solid acid carrier and the cerium oxide.

2. The composition according to claim 1, wherein the hydrocarbon is at least one compound selected from the group consisting of a lower alkyne, a lower alkene, a lower diene and a lower alkane.

3. The composition according to claim 1, wherein the oxygen-containing organic compound is at least one compound selected from the group consisting of an alcohol, an ether, a carboxylate and a ketone.

4. The composition according to claim 1, wherein the hydrocarbon and oxygen-containing organic compound are present in an amount of from 0.1 to 2 mols per mol of nitrogen oxides.

5. The composition according to claim 1, wherein the reducing agent is the hydrocarbon.

6. The composition according to claim 1, wherein the reducing agent is the oxygen-containing organic compound.

7. The composition according to claim 1, wherein the solid acid carrier is a zeolite type solid acid carrier.

8. A catalyst for catalytic reduction of nitrogen oxides using at least one reducing agent selected from the group consisting of a hydrocarbon and an oxygen-containing organic compound, which consists essentially of cerium oxide supported on a solid acid carrier.

* * * * *